US012760865B2

(12) United States Patent
Teunissen et al.

(10) Patent No.: US 12,760,865 B2
(45) Date of Patent: Oct. 13, 2026

(54) LIGHTING SYSTEM WITH ENHANCED COLOR GAMUT

(71) Applicant: SIGNIFY HOLDING B.V., Eindhoven (NL)

(72) Inventors: Cornelis Teunissen, Eindhoven (NL); Marcel Petrus Lucassen, Landsmeer (NL); Martinus Petrus Joseph Peeters, Weert (NL); René Theodorus Wegh, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/140,060

(22) PCT Filed: Dec. 20, 2023

(86) PCT No.: PCT/EP2023/086820
§ 371 (c)(1),
(2) Date: Jun. 17, 2025

(87) PCT Pub. No.: WO2024/141360
PCT Pub. Date: Jul. 4, 2024

(65) Prior Publication Data

US 2026/0210527 A1 Jul. 23, 2026

(30) Foreign Application Priority Data

Dec. 27, 2022 (EP) .................................... 22216702

(51) Int. Cl.
*F21V 9/38* (2018.01)
*F21K 9/64* (2016.01)
(Continued)

(52) U.S. Cl.
CPC .................. *F21V 9/38* (2018.02); *F21K 9/64* (2016.08); *F21V 9/40* (2018.02); *F21W 2131/1005* (2013.01); *F21W 2131/103* (2013.01)

(58) Field of Classification Search
CPC ................. F21V 9/38; F21V 9/64; F21V 9/40
See application file for complete search history.

(56) References Cited

U.S. PATENT DOCUMENTS 7,851,987 B2 * 12/2010 Kane .................... H10K 59/351 313/506
8,441,026 B2 * 5/2013 Meyer ................... C04B 35/584 257/E33.061

(Continued)

FOREIGN PATENT DOCUMENTS

WO 2014068440 A1 5/2014

*Primary Examiner* — Bryon T Gyllstrom

(57) ABSTRACT

The invention provides a light generating system (1000) comprising (i) one or more light generating devices (100) and (ii) two or more luminescent materials (200), wherein: (A) the one or more light generating devices (100) are configured to generate device light (101); wherein the one or more light generating devices (100) comprise a first light generating device (110); (B) the first light generating device (110) is configured to generate first device light (111) having a peak wavelength selected from the range of 440-460 nm; (C) the two or more luminescent materials are configured to generate luminescent material light (201); wherein the two or more luminescent materials (200) comprises a first luminescent material (210) and a second luminescent material (220); (D) the first luminescent material (210) is configured to convert at least part of the first device light (111) into first luminescent material light (211) having a peak wavelength selected from the range of 495-580 nm, and a full width half maximum selected from the range of 25-120 nm; (E) the second luminescent material (220) is configured to convert (Continued)

at least part of the first device light (111) and/or part of the first luminescent material light (211) into second luminescent material light (221) having a peak wavelength selected from the range of 600-680 nm, wherein the second luminescent material (220) at least comprises a luminescent material configured to provide luminescent material light in said wavelength range having a full width half maximum selected from the range of 50-140 nm; (F) the light generating system (1000) is configured to generate white system light (1001) comprising at least part of the device light (101) and at least part of the luminescent material light (201).

15 Claims, 5 Drawing Sheets

(51) Int. Cl.

| | |
|---|---|
| ***F21V 9/40*** | (2018.01) |
| ***F21W 131/10*** | (2006.01) |
| ***F21W 131/103*** | (2006.01) |

(56) References Cited

U.S. PATENT DOCUMENTS

| | | | | |
|---|---|---|---|---|
| 9,004,705 | B2 * | 4/2015 | Li | F21K 9/232 362/249.02 |
| 9,215,761 | B2 * | 12/2015 | van de Ven | H05B 33/02 |
| 9,871,173 | B2 * | 1/2018 | Todorov | H10H 20/8513 |
| 10,750,591 | B2 * | 8/2020 | Petluri | A61N 5/0618 |
| 11,102,863 | B2 * | 8/2021 | Petluri | H05B 45/20 |
| 11,901,492 | B2 * | 2/2024 | Li | H10H 20/8513 |
| 12,327,978 | B2 * | 6/2025 | Kundaliya | H10H 20/855 |
| 2018/0248084 | A1 | 8/2018 | Peeters et al. | |
| 2018/0323350 | A1 * | 11/2018 | Oh | H10H 20/8513 |
| 2020/0240596 | A1 * | 7/2020 | Yuan | F21K 9/64 |
| 2020/0303356 | A1 | 9/2020 | Li et al. | |
| 2022/0272806 | A1 | 8/2022 | Petluri et al. | |
| 2025/0180175 | A1 * | 6/2025 | Van Bommel | F21K 9/00 |

* cited by examiner

LIGHTING SYSTEM WITH ENHANCED COLOR GAMUT

CROSS-REFERENCE TO PRIOR APPLICATIONS

This application is the U.S. National Phase application under 35 U.S.C. § 371 of International Application No. PCT/EP2023/086820, filed on Dec. 20, 2023, which claims the benefit of European Patent Application No. 22216702.5, filed on Dec. 27, 2022. These applications are hereby incorporated by reference herein.

FIELD OF THE INVENTION

The invention relates to a light generating system and a lighting device comprising such light generating system. The invention also relates to a street lighting device comprising such light generating system or lighting device, as well as to the use of such light generating system or lighting device.

BACKGROUND OF THE INVENTION

Light emitting devices with a high gamut index are known in the art. US2020/0240596, for instance, describes a white light emitting device which includes a solid-state excitation source operable to generate excitation light having a dominant wavelength ranging from 440 nm to 455 nm; a first photoluminescence material which generates light having a peak emission wavelength ranging from 500 nm to 530 nm; and a second photoluminescence material which generates light having a peak emission wavelength ranging from 640 nm to 690 nm, wherein the device is operable to generate white light with an IES TM-30 Gamut Index Rg ranging from 105 to 115. The device is indicated to be operable to generate white light having an IES TM-30 Fidelity Index Rf which ranges from 85 to 95 and a sum of Gamut Index Rg and fidelity index Rf is greater than or equal to 195 and less than or equal to 200.

US2018/323350A discloses a white light emitting device, comprising a blue light emitting diode, a first wavelength conversion material to emit green light, and a second wavelength conversion material to emit red light. The white light emitting device is configured to emit white light having an emission spectrum including a first peak wavelength in a range of 440 nm to 455 nm, a second peak wavelength in a range of 530 nm to 540 nm, and a third peak wavelength in a range of 640 nm to 650 nm. The lowest intensity of the emitted white light between the second peak wavelength and the third peak wavelength being 45% to 55% of a maximum peak intensity of the emitted white light among the first peak wavelength, the second peak wavelength, and the third peak wavelength.

SUMMARY OF THE INVENTION

Energy efficiency still is very important, even with the introduction of solid-state lighting, which technology already is much more energy efficient compared to conventional lighting products. Solid-state lighting provides an almost unlimited variety in spectral power distributions (SPDs) to generate specific lighting effects. The drawback of this flexibility in SPDs is that not all induced visible effects are easily captured with the current set of specification items. For typical white-light applications, the CIE General color rendering index (CRI), defined in CIE publication 13.3

(1995), is often used for defining minimum requirements of the light quality. A light source, with a given target correlated color temperature (CCT), qualifies when the CRI is above a predefined threshold value (for indoor lighting typically CRI≥80 and for outdoor lighting typically CRI≥70). As a result, most light sources are optimized to provide the highest energy efficiency while just meeting the minimum CRI requirement. However, it was found that object colors (particularly reddish colors) will typically appear less saturated when illuminated under these energy-optimized light sources when compared to a (less energy efficient) reference source with a CRI of 100. This reduced saturation is particularly detrimental at low illumination levels, in the mesopic vision range, where color vision may already be compromised.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system comprising (i) one or more light generating devices and (ii) two or more luminescent materials. Especially, the one or more light generating devices are configured to generate device light. In embodiments, the one or more light generating devices comprise a first light generating device. In specific embodiments, the one or more light generating devices comprise a solid state light source. More especially, the first light generating device comprises a solid state light source. In specific embodiments, the first light generating device may be configured to generate first device light having a peak wavelength selected from the range of 440-460 nm. Further, in embodiments the two or more luminescent materials may be configured to generate luminescent material light. Especially, the two or more luminescent materials may comprise a first luminescent material and a second luminescent material. In embodiments, the first luminescent material may be configured to convert at least part of the first device light into first luminescent material light having a peak wavelength, which may in embodiments be selected from the range of 495-580 nm, and/or a full width half maximum, which may in embodiments be selected from the range of 25-120 nm. In (further) embodiments, the second luminescent material may be configured to convert at least part of the first device light and/or part of the first luminescent material light into second luminescent material light, which may in embodiments have a peak wavelength selected from the range of 600-680 nm. In specific embodiments, the second luminescent material at least comprises a luminescent material configured to provide luminescent material light in said wavelength range, having in embodiments a full width half maximum selected from the range of 50-140 nm. In specific embodiments, the light generating system is configured to generate (in a first operational mode (of the light generating system) white system light comprising at least part of the device light and at least part of the luminescent material light. Especially, the white system light has a correlated color temperature (CCT). Further, in embodiments the light generating system may be configured such that the system light complies with one or more of the following conditions:

(a) a luminous efficacy of radiation for photopic vision (LER), lm per optical Watts, above the equation $LERmin=0.90*(-5.946E-13*x^4+1.247E-08*x^3-9.622E-05*x^2+3.115E-01*x+6.0)$;

(b) an area F1 in the CIE 1976 u'v' chromaticity space calculated using the 85 test-color samples of the Farnsworth-Munsell 100 (FM100) Hue Test is below the equation $F1_{max}=-5.519E-15*x^3-4.380E-11*x^2+1.724E-06*x+1.17E-03$ (±10%), and above the equation $F1_{min}=F1_{max}-1.67E-03$ (±10%);

(c) a first radiant flux E1 within the wavelength range of 380-490 nm, relative to a total radiant flux Et in the wavelength range of 380-780 nm is below the equation $E1_{max}/Et=3.207E-11*x^3-1.097E-06*x^2+1.297E-02*x-10.3$ (±10%), and above the equation $E1_{min}/Et=E1_{max}/Et-6.5$ (±10%);

(d) a second radiant flux E2 within the wavelength range of 490-600 nm, relative to a total radiant flux Et in the wavelength range of 380-780 nm is below the equation $E2_{max}/Et=3.444E-10*x^3-5.329E-06*x^2+2.611E-02*x+7.7$ (±10%), and above the equation $E2_{min}/Et=E2_{max}/Et-6.5$ (±10%);

(e) a third radiant flux E3 within the wavelength range of 600-780 nm, relative to a total radiant flux Et in the wavelength range of 380-780 nm is below the equation $E3_{max}/Et=-2.988E-10*x^3+5.192E-06*x^2-3.294E-02*x+103$ (±10%), and above the equation $E3_{min}/Et=E3_{max}/Et-6.5$ (±10%);

wherein x is the correlated color temperature, which is selected from the range of 1500-6500 K, more especially 1800-6500 K.

Further, in embodiments (f) especially the color rendering index (CRI) is at least 70. Yet, in embodiments (g) the red color rendering index ($R_9$) (such as defined in CIE publication 13.3 (1995)), may especially be above the equation $R_{9,min}=7.84E-11*x^3-2.54E-06*x^2+2.77E-02*x-90$ (±10%).

Therefore, in embodiments the invention provides a light generating system comprising (i) one or more light generating devices and (ii) two or more luminescent materials, wherein: (A) the one or more light generating devices are configured to generate device light; wherein the one or more light generating devices comprise a first light generating device; (B) the first light generating device is configured to generate first device light having a peak wavelength selected from the range of 440-460 nm; (C) the two or more luminescent materials are configured to generate luminescent material light; wherein the two or more luminescent materials comprises a first luminescent material and a second luminescent material; (D) the first luminescent material is configured to convert at least part of the first device light into first luminescent material light having a peak wavelength selected from the range of 495-580 nm, and a full width half maximum selected from the range of 25-120 nm; (E) the second luminescent material is configured to convert at least part of the first device light and/or part of the first luminescent material light into second luminescent material light having a peak wavelength selected from the range of 600-680 nm, wherein the second luminescent material at least comprises a luminescent material configured to provide luminescent material light in said wavelength range having a full width half maximum selected from the range of 50-140 nm; (F) the light generating system is configured to generate (in a first operational mode of the light generating system) white system light comprising at least part of the device light and at least part of the luminescent material light, wherein the white system light has a correlated color temperature (CCT); and (G) the light generating system is configured such that the system light complies with one or more of the above defined conditions, especially all of the above defined conditions a-e, and optionally also one or more of the conditions f-g, such as all conditions f-g. In embodiments the one or more light generating devices may comprise a second light generating device configured to generate second device light having a peak wavelength in the wavelength range of 590-680 nm, more especially 600-680 nm. In specific embodiments, the second light generating device comprises a solid state light source.

With such light generating system, white light can be generated in a relatively efficient way and also having a relatively high color gamut and/or improved whiteness perception. With the light of such system, a better object visibility may be provided or the same visual appearance at lower energy consumption. Hence, with the present invention a better visibility at the same light level (safety) or same visibility at a lower light level (energy reduction) may e.g. be provided.

As indicated above, the light generating system may comprise (i) one or more light generating devices and (ii) two or more luminescent materials. It appears that to obtain a large color gamut and a relatively efficient light generating system, the use of, wherein one or more light generating devices and (ii) two or more luminescent materials, may have certain advantages over using only primaries (like RGB LEDs; though such solution may also have (other) advantages). The presently proposed solution, however, appears to allow generation of white light in a relatively efficient way and the white light having a relatively high color gamut and/or improved whiteness perception.

Here below, first some aspects in relation to light generating devices and luminescent materials are described, followed by some more (specific) embodiments.

A light generating device may especially be configured to generate device light. Especially, the light generating device may comprise a light source. The light source may especially configured to generate light source light. In embodiments, the device light may essentially consist of the light source light. In other embodiments, the device light may essentially consist of converted light source light. In yet other embodiments, the device light may comprise (unconverted) light source light and converted light source light. Light source light may be converted with a luminescent material into luminescent material light and/or with an upconverter into upconverted light (see also below). The term "light generating device" may also refer to a plurality of light generating devices which may provide device light having essentially the same spectral power distributions. In specific embodiments, the term "light generating device" may also refer to a plurality of light generating devices which may provide device light having different spectral power distributions.

The term "light source" may in principle relate to any light source known in the art. It may be a conventional (tungsten) light bulb, a low pressure mercury lamp, a high pressure mercury lamp, a fluorescent lamp, an LED (light emissive diode). In a specific embodiment, the light source comprises a solid state LED light source (such as an LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chip-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The term “light source” may also refer to a chip scaled package (CSP). A CSP may comprise a single solid state die with provided thereon a luminescent material comprising layer. The term “light source” may also refer to a midpower package. A midpower package may comprise one or more solid state die(s). The die(s) may be covered by a luminescent material comprising layer. The die dimensions may be equal to or smaller than 2 mm, such as in the range of e.g. 0.2-2 mm. Hence, in embodiments the light source comprises a solid state light source. Further, in specific embodiments, the light source comprises a chip scale packaged LED. Herein, the term “light source” may also especially refer to a small solid state light source, such as having a mini size or micro size. For instance, the light sources may comprise one or more of mini LEDs and micro LEDs. Especially, in embodiment the light sources comprise micro LEDs or “microLEDs” or “μLEDs”. Herein, the term mini size or mini LED especially indicates to solid state light sources having dimensions, such as die dimension, especially length and width, selected from the range of 100 μm-1 mm. Herein, the term μ size or micro LED especially indicates to solid state light sources having dimensions, such as die dimension, especially length and width, selected from the range of 100 μm and smaller.

The light source may have a light escape surface. Referring to conventional light sources such as light bulbs or fluorescent lamps, it may be an outer surface of a glass or a quartz envelope. For LED’s it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term “light source” may refer to a semiconductor light-emitting device, such as a light emitting diode (LEDs), a resonant cavity light emitting diode (RCLED), a vertical cavity laser diode (VCSELs), an edge emitting laser, etc. The term “light source” may also refer to an organic light-emitting diode (OLED), such as a passive-matrix (PMOLED) or an active-matrix (AMOLED). In a specific embodiment, the light source comprises a solid-state light source (such as an LED or laser diode). In an embodiment, the light source comprises an LED (light emitting diode). The terms “light source” or “solid state light source” may also refer to a superluminescent diode (SLED).

The term LED may also refer to a plurality of LEDs.

The term “light source” may also relate to a plurality of (essentially identical (or different)) light sources, such as 2-2000 solid state light sources. In embodiments, the light source may comprise one or more micro-optical elements (array of micro lenses) downstream of a single solid-state light source, such as an LED, or downstream of a plurality of solid-state light sources (i.e. e.g. shared by multiple LEDs). In embodiments, the light source may comprise an LED with on-chip optics. In embodiments, the light source comprises pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material (“phosphor”) may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as an LED with a luminescent material layer or dome comprising luminescent material. Such LEDs may be indicated as phosphor converted LEDs or PC LEDs (phosphor converted LEDs). In other embodiments, the luminescent material may be configured at some distance (“remote”) from the light source, such as an LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be converted by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,) and a spectral power distribution. The light source light may in embodiments comprise one or more bands, having band widths as known for lasers.

The term “light source” may (thus) refer to a light generating element as such, like e.g. a solid state light source, or e.g. to a package of the light generating element, such as a solid state light source, and one or more of a luminescent material comprising element and (other) optics, like a lens, a collimator. A light converter element (“converter element” or “converter”) may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term “light source” herein may also refer to a light source comprising a solid state light source, such as an LED or a laser diode or a superluminescent diode.

The term “light source” may (thus) in embodiments also refer to a light source that is (also) based on conversion of light, such as a light source in combination with a luminescent converter material. Hence, the term “light source” may also refer to a combination of an LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like an LED, and an optical filter, which may change the spectral power distribution of the light generated by the light source. Especially, the term "light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

Hence, each of the one or more light generating devices may comprise one or more solid state light sources, such as LEDs, diode lasers, and superluminescent diodes.

Especially, the one or more light generating devices are configured to generate device light. In embodiments, the spectral power distribution of the device light may be in the visible wavelength range (see also below). When there is a single type of light generating devices, then there may be essentially a single peak wavelength (though there may be some variation within about 20 nm, e.g. due to different bins). However, when there are more than one different types of light generating devices, then there may in embodiments be more than one single peak wavelength, with inter-peak distance of at least 20 nm. For instance, the one or more light generating devices may comprise two types of light generating devices, a first one configured to generate first device light having a peak wavelength e.g. selected from the range of 440-460 nm, and another one configured to generate device light having a peak wavelength in the wavelength range of 590-680 nm, more especially 600-680 nm, or having a peak wavelength in the wavelength range of 490-570 nm, such as 490-560 nm, like in embodiments 500-560 nm. More than two types of light generating devices may also be possible. As can be derived from the above, the term "type of light generating device" may also refer to a plurality of light generating devices of the same type.

Especially, in embodiments the one or more light generating devices comprise a first light generating device, more especially wherein the first light generating device is configured to generate first device light having a peak wavelength selected from the range of 440-460 nm. Hence, in embodiments the first light generating device may be configured to generate blue (first) device light. In specific embodiments, the first light generating device is configured to generate first device light have a spectral power distribution in the visible wavelength range, wherein at least 80% of the spectral power, more especially at least 90% of the spectral power, is in the blue wavelength range.

The terms "visible", "visible light", "visible wavelength range" or "visible emission" and similar terms refer to light having a wavelength selected from the wavelength range of 380-780 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission", and similar terms, may especially relate to light having a wavelength in the range of about 380-440 nm. In specific embodiments, the violet light may have a centroid wavelength in the 380-440 nm range. The terms "blue light" or "blue emission", and similar terms, may especially relate to light having a wavelength in the range of about 440-490 nm (including some violet and cyan hues). In specific embodiments, the blue light may have a centroid wavelength in the 440-490 nm range. The terms "green light" or "green emission", and similar terms, may especially relate to light having a wavelength in the range of about 490-560 nm. In specific embodiments, the green light may have a centroid wavelength in the 490-560 nm range. The terms "yellow light" or "yellow emission", and similar terms, may especially relate to light having a wavelength in the range of about 560-590 nm. In specific embodiments, the yellow light may have a centroid wavelength in the 560-590 nm range. The terms "orange light" or "orange emission", and similar terms, may especially relate to light having a wavelength in the range of about 590-620 nm. In specific embodiments, the orange light may have a centroid wavelength in the 590-620 nm range. The terms "red light" or "red emission", and similar terms, may especially relate to light having a wavelength in the range of about 620-750 nm. In specific embodiments, the red light may have a centroid wavelength in the 620-750 nm range. The terms "cyan light" or "cyan emission", and similar terms, especially relate to light having a wavelength in the range of about 490-520 nm. In specific embodiments, the cyan light may have a centroid wavelength in the 490-520 nm range. The terms "amber light" or "amber emission", and similar terms, may especially relate to light having a wavelength in the range of about 585-605 nm, such as about 590-600 nm. In specific embodiments, the amber light may have a centroid wavelength in the 585-605 nm range.

The phrase "in the green-yellow wavelength range", and similar phrases, may indicate spectral power at one or more wavelengths in the green wavelength range and/or spectral power at one or more wavelengths in the yellow wavelength range. The green-yellow wavelength range is defined as the 490-590 nm wavelength range. Note that the luminescent material providing luminescent material light having spectral power in the green-yellow wavelength range may in embodiments only have spectral power in this 490-590 nm wavelength range (within the 380-780 nm wavelength range), but may in other embodiments also have spectral power within the 380-780 nm wavelength range at other wavelengths than within the 490-590 nm wavelength range.

The phrase "in the orange-red wavelength range", and similar phrases, may indicate spectral power at one or more wavelengths in the orange wavelength range and/or spectral power at one or more wavelengths in the red wavelength range. The orange-red wavelength range is defined as the 600-750 nm wavelength range. Note that the luminescent material providing luminescent material light having spectral power in the orange-red wavelength range may in embodiments only have spectral power in this 600-750 nm wavelength range (within the 380-780 nm wavelength range), but may in other embodiments also have spectral power within the 380-780 nm wavelength range at other wavelengths than within the 600-750 nm wavelength range.

The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

As indicated above, the light generating system may comprise two or more luminescent materials. The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition. Instead of the term "luminescent material" also the term "phosphor" may be applied. These terms are known to the person skilled in the art.

In embodiments, luminescent materials are selected from garnets and nitrides, especially doped with trivalent cerium or divalent europium, respectively. The term "nitride" may also refer to oxynitride or nitridosilicate, etc. Alternatively or additionally, the luminescent material(s) may be selected from silicates, especially doped with divalent europium.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B may comprise aluminum (Al); however, in addition to aluminum, B may also partly comprise gallium (Ga) and/or scandium (Sc) and/or indium (In), especially up to about 20% of B, more especially up to about 10% of B (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1}A'_{x2}Ce_{x3})_3(Al_{y1}B'_{y2})_5O_{12}$, wherein x1+x2+x3=1, wherein x3>0, wherein 0<x2+x3≤0.2, wherein y1+y2=1, wherein especially 0≤y2≤0.2, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (optionally in combination with (the) light of other sources of light as described herein). Hence, in specific embodiments A may be selected from the group consisting of Lu and Gd. Alternatively or additionally, B may comprise Ga. Hence, in embodiments the luminescent material comprises $(Y_{x1}(Lu,Gd)_{x2}Ce_{x3})_3(Al_{y1}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1}A'_{x2}Ce_{x3})_3(Al_{y1}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1}A'_{x2}Ce_{x3})_3(Al_{y1}B'_{y2})_5O_{12}$. Here, wherein A' comprises one or more elements selected from the group consisting of lanthanides, and wherein B' comprises one or more elements selected from the group consisting of Ga, In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, the luminescent material may comprise a luminescent material of the type $A_3Si_6N_{11}$:$Ce^3$, wherein A comprises one or more of Y, La, Gd, Tb and Lu, such as in embodiments one or more of La and Y.

In embodiments, the luminescent material may alternatively or additionally comprise one or more of MS:$Eu^{2+}$ and/or $M_2Si_5N_5$:$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)$AlSiN_3$:Eu and $(Ba,Sr,Ca)_2Si_5N_5$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_5$:Eu can also be indicated as $M_2Si_5N_5$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_5$:Eu (i.e. 75% Ba; 25% Sr). Here, Eu is introduced and replaces at least part of M, i.e. one or more of Ba, Sr, and Ca). Likewise, the material (Ba,Sr,Ca)$AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)$AlSiN_3$:Eu and $(Ba,Sr,Ca)_2Si_5N_5$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material $(Ba,Sr,Ca)_2Si_5N_5$:Eu can also be indicated as $M_2Si_5N_5$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_5$:Eu (i.e. 75% Ba; 25% Sr). Here, Eu is introduced and replaces at least part of M, i.e. one or more of Ba, Sr, and Ca).

Likewise, the material (Ba,Sr,Ca)$AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

As indicated above, the light generating system may comprise two or more luminescent materials. These luminescent materials may especially differ in that they substantially emit in different wavelength ranges. A first luminescent material may provide first luminescent material light having a substantial spectral power in the green-yellow wavelength range and a second luminescent material may provide second luminescent material light having a substantial spectral power in the green-yellow wavelength range.

Hence, the two or more luminescent materials may especially be configured to generate luminescent material light; wherein the two or more luminescent materials comprises a first luminescent material and a second luminescent material.

In embodiments, the first luminescent material may be configured to convert at least part of the first device light into first luminescent material light having a peak wavelength selected from the range of 495-580 nm, and a full width half maximum selected from the range of 25-120 nm. More especially, the full width half maximum is at least 40 nm, more especially at least 50 nm. Especially, the first luminescent material is a broad band emitting luminescent material. The luminescent material may be chosen such that an emission band of a full width half maximum (of the luminescent material light) of at least 40 nm, such as at least 50 nm is obtained. For instance, the luminescent material may be chosen such that an emission band of a full width half maximum of at least 60 nm, is obtained. This may e.g. be the case with trivalent cerium comprising garnet luminescent materials (as described herein). Hence, especially the luminescent material may comprise a broad band emitter. The luminescent material may also comprise a plurality of broad band emitters. Especially, when two or more luminescent materials are applied to convert at least part of the first device light and/or at least part of the second device light, at least two of the two or more luminescent materials may be configured to provide respective luminescent material light each having an emission band with full width half maximum (of the luminescent material light) of at least 40 nm, such as at least 50 nm.

Further, in embodiments the second luminescent material is configured to convert at least part of the first device light and/or part of the first luminescent material light into second luminescent material light having a peak wavelength selected from the range of 590-680 nm, more especially 600-680 nm. More especially, the second luminescent material may at least comprises a luminescent material configured to provide luminescent material light in said wavelength range having a full width half maximum selected from the range of 25-150 nm, more especially 40-150 nm, such as in embodiments 50-140 nm. Especially, the second luminescent material is (also) a broad band emitting luminescent material (see further also above about broad band emitting luminescent materials). In specific embodiments, the second luminescent material light may have a peak wavelength selected from the range of 605-680 nm.

In embodiments, the light generating system may be configured to generate system light comprising one or more of (i) at least part of the device light and (ii) at least part of the luminescent material light. Especially, in embodiments, the light generating system is configured to generate (in a first operational mode of the light generating system) white system light.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed. Hence, the light generating system may in embodiments be a system operable in a single operational mode, providing system light having a fixed spectral power distribution. In other embodiments, the light generating system may in embodiments be a system operable in two or more operational modes, providing system light having controllable spectral power distribution. In the latter embodiments, the light generating system may comprise a control system or may be functionally coupled to a control system. The control system may control the spectral power distribution of the system light. Further, a control system may be used to control a radiant flux of the system light. Therefore, even a light generating system operable in a single operational mode may comprise a control system or may be functionally coupled to a control system for controlling the radiant flux of the system light.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Thread, WIFI, LiFi, ZigBee, BLE or WiMAX, or another wireless technology.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Especially, in a first operational mode the system light is white system light. The white system light may especially comprise at least part of the device light and at least part of the luminescent material light. The white system light has a correlated color temperature (CCT), which may in specific embodiments be selected from the range of 1500-6500 K, more especially 1800-6500 K (see also below).

The term "white light", and similar terms, herein, is known to the person skilled in the art. It may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. In embodiments, e.g. for backlighting purposes, or for other purposes, the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments, the correlated color temperature (CCT) may be selected from the range of 6000-12000 K, like selected from the range of 7000-12000 K, like at least 8000 K. Yet further, in embodiments the correlated color temperature (CCT) may be selected from the range of 6000-12000 K, like selected from the range of 7000-12000 K, in combination with a CRI of at least 70.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relatively high blue component in the light source light.

Herein, the CRI of the white system light may especially be at least about 65, such as especially at least about 70. Further, herein the CCT of the white system light may thus especially be selected from the range of 1800-6500 K.

In order to obtain the desired gamut (and efficient light generating device), it appears desirable that the color point is defined in within a specific part of the color space. In specific embodiments, the light generating system may be configured such that the (white) system light complies with the following conditions: an area F1 in the CIE 1976 u'v' chromaticity space calculated using the 85 test-color samples of the Farnsworth-Munsell 100 (FM100) Hue Test is below the equation $F1_{max}=-5.519E-15*x^3-4.380E-11*x^2+1.724E-06*x+1.17E-03$ (±10%), and above the equation $F1_{min}=F1_{max}-1.67E-03$ (±10%). More especially, the area F1 may be below the equation $F1_{max}=-5.519E-15*x^3-4.380E-11*x^2+1.724E-06*x+1.17E-03$ (±5%), and above the equation $F1_{min}=F1_{max}-1.67E-03$ (±5%), such as the area F1 may be below the equation $F1_{max}=-5.519E-15*x^3-4.380E-11*x^2+1.724E-06*x+1.17E-03$, and above the equation $F1_{min}=F1_{max}-1.67E-03$. Especially, F1 refers to the area of the FM100 samples in the CIE 1976 u',v' chromaticity diagram.

Phrases like "below the equation $F1_{max}=(-5.519E-15*x^3-4.380E-11*x^2+1.724E-06*x+1.17E-03)\pm10\%$", and similar phrases, indicate a maximum value, dependent from the CCT (here x), with a margin of ±10%. Especially, such phrases refer to the indicated CCT dependent maximum value ±10%. Likewise, phrases like $F1_{max}=(-5.519E-15*x^3-4.380E-11*x^2+1.724E-06*x+1.17E-03)\pm5\%$", and similar phrases indicate a maximum value, dependent from the CCT (here x), with a margin of ±5%. Hence, Especially, such phrases refer to the indicated CCT dependent maximum value ±5%. Hence, effectively the maxima may be 10% or 5%, respectively, above the equation, which indicates maxima for F1. Likewise, this may thus apply for similar phrases.

Similarly, phrases like "above the equation $F1_{min}$=$F1_{max}$−1.67E-03 (±10%)", and similar phrases, indicate a minimum value, dependent from the CCT (here x), with a margin of ±10%. Especially, such phrases refer to the indicated CCT dependent minimum value −10%. Likewise, phrases like "above the equation $F1_{min}$=$F1_{max}$−1.67E-03 (±5%)", and similar phrases, indicate a minimum value, dependent from the CCT (here x), with a margin of ±5%. Especially, such phrases refer to the indicated CCT dependent minimum value −5%. Hence, effectively the minima may be 10% or 5%, respectively, below the equation, which indicates minima for F1. Likewise, this may thus apply for similar phrases.

The Farnsworth Munsell 100 Hue Test is known in the art and is commercially available. It is herein amongst others referred to https://www.appletizer.nl/nl/farnsworth-munsell-100-hue-test/and https://www.xrite.com/categories/visual-assessment-tools/fm-100-hue-test (which are herein incorporated by reference). In order to calculate the gamut area, of the light generated by the light generating system, in the CIE 176 u'v' chromaticity space, the reflectance factors of the 85 test-color samples may be used in the visible range.

Further, in order to obtain the desired gamut (and efficient light generating device), it appears desirable that the light generating system may be configured such that the system light complies with the following conditions: a first radiant flux E1 within the wavelength range of 380-490 nm, relative to a total radiant flux Et in the wavelength range of 380-780 nm is below the equation $E1_{max}$/Et=3.207E-11*$x^3$−1.097E-06*$x^2$+1.297E-02*x−10.3 (±10%), and above the equation $E1_{min}$/Et=$E1_{max}$/Et−6.5 (±10%). More especially, the first radiant flux E1 within the wavelength range of 380-490 nm, relative to a total radiant flux Et in the wavelength range of 380-780 nm may be below the equation $E1_{max}$/Et=3.207E-11*$x^3$−1.097E-06*$x^2$+1.297E-02*x−10.3 (±5%), and above the equation $E1_{min}$/Et=$E1_{max}$/Et−6.5 (±5%), such as the first radiant flux E1 within the wavelength range of 380-490 nm, relative to a total radiant flux Et in the wavelength range of 380-780 nm being below the equation $E1_{max}$/Et=3.207E-11*$x^3$−1.097E-06*$x^2$+1.297E-02*x−10.3, and above the equation $E1_{min}$/Et=$E1_{max}$/Et−6.5. Hence, these conditions especially refer to the radiant flux in the blue wavelength range. Note that a substantial part of the light in the blue wavelength range, such as at least 50% of the radiant flux in the blue wavelength range, may be within the wavelength range of 430-470 nm, such as selected from the range of 435-465 nm.

Further, in order to obtain the desired gamut (and efficient light generating device), it appears desirable that the light generating system may be configured such that the system light complies with the following conditions: a second radiant flux E2 within the wavelength range of 490-600 nm, relative to a total radiant flux Et in the wavelength range of 380-780 nm is below the equation $E2_{max}$/Et=3.444E-10*$x^3$−5.329E-06*$x^2$+2.611E-02*x+7.7 (±10%), and above the equation $E2_{min}$/Et=$E2_{max}$/Et−6.5 (±10%). More especially, in embodiments the second radiant flux E2 within the wavelength range of 490-600 nm, relative to a total radiant flux Et in the wavelength range of 380-780 nm may be below the equation $E2_{max}$/Et=3.444E-10*$x^3$−5.329E-06*$x^2$+2.611E-02*x+7.7 (±5%), and above the equation $E2_{min}$/Et=$E2_{max}$/Et−6.5 (±5%), such as the second radiant flux E2 within the wavelength range of 490-600 nm, relative to a total radiant flux Et in the wavelength range of 380-780 nm being below the equation $E2_{max}$/Et=3.444E-10*$x^3$−5.329E-06*$x^2$+2.611E-02*x+7.7, and above the equation $E2_{min}$/Et=$E2_{max}$/Et−6.5. Hence, these conditions especially refer to the radiant flux in the wavelength range including the green wavelength range, the yellow wavelength range, and part of the orange wavelength range (a shorter wavelength part of the orange wavelength range.

Yet further, in order to obtain the desired gamut (and efficient light generating device), it appears desirable that the light generating system may be configured such that the system light complies with the following conditions: a third radiant flux E3 within the wavelength range of 600-780 nm, relative to a total radiant flux Et in the wavelength range of 380-780 nm may be below the equation $E3_{max}$/Et=−2.988E-10*$x^3$+5.192E-06*$x^2$-3.294E-02*x+103 (±10%), and above the equation $E3_{min}$/Et=$E3_{max}$/Et−6.5 (±10%). More especially, in embodiments the third radiant flux E3 within the wavelength range of 600-780 nm, relative to a total radiant flux Et in the wavelength range of 380-780 nm may be below the equation $E3_{max}$/Et=−2.988E-10*$x^3$+5.192E-06*$x^2$−3.294E-02*x+103 (±5%), and above the equation $E3_{min}$/Et=$E3_{max}$/Et−6.5 (±5%), such as the third radiant flux E3 within the wavelength range of 600-780 nm, relative to a total radiant flux Et in the wavelength range of 380-780 nm being below the equation $E3_{max}$/Et=−2.988E-10*$x^3$+5.192E-06*$x^2$−3.294E-02*x+103, and above the equation $E3_{min}$/Et=$E3_{max}$/Et−6.5. Hence, these conditions especially refer to the radiant flux in the wavelength range including part of the orange wavelength range (a larger wavelength part of the orange wavelength range) and the red wavelength range.

Yet further, in order to obtain the desired gamut (and efficient light generating device), it appears desirable that the light generating system may be configured such that the system light complies with the following condition: a luminous efficacy of radiation (LER), lm per optical Watts, may be above the equation $LER_{min}$=0.90*(−5.946E-13*$x^4$+1.247E-08*$x^3$−9.622E-05*$x^2$+3.115E-01*x+6.0), more especially above the equation $LER_{min}$=0.95*(−5.946E-13*$x^4$+1.247E-08*$x^3$−9.622E-05*$x^2$+3.115E-01*x+6.0), such as above the equation $LER_{min}$=0.98*(−5.946E-13*$x^4$+1.247E-08*$x^3$−9.622E-05*$x^2$+3.115E-01*x+6.0). Then the most efficient solutions may be provided.

Yet further, in order to obtain the desired gamut (and efficient light generating device), it appears desirable that the light generating system may be configured such that the system light complies with the following condition: red color rendering index ($R_9$) may especially be above the equation $R_{9,min}$=7.84E-11*$x^3$−2.54E-06*$x^2$+2.77E-02*x−90 (±10%), more especially above the equation $R_{9,min}$=7.84E-11*$x^3$−2.54E-06*$x^2$+2.77E-02*x−90 (±5%), such as above the equation $R_{9,min}$=7.84E-11*$x^3$−2.54E-06*$x^2$+2.77E-02*x−90. Note that herein, as known in the art, "E-01" may refer to 0.1. Hence, e.g. 3.115E-01 may thus refer to 0.3155. Likewise, this applies to other values indicated herein.

The luminous efficacy of radiation is amongst others defined in https://cie.co.at/eilvterm/17-21-090 and CIE S 017/E:2020 "ILV: International Lighting Vocabulary", 2nd edition, clause 17-21-090.

In above (and below) formulas, x is the correlated color temperature (CCT with unit Kelvin), which may especially be selected from the range of 1800-6500 K.

Especially, the present solution may be useful in the 1800-4500 K CCT range, more especially at least about 2000 K and at maximum about 4000 K. Hence, in embodiments the correlated color temperature is selected from the range of 2000-4000 K. The increased gamut area may especially be substantial at CCT values of at maximum about 5000 K, such as at maximum about 4000 K. More especially, in embodiments the correlated color temperature is selected from the range of at maximum 3000 K. In other embodiments, the CCT value(s) may be selected from the range of 4000-6500 K, such as 4000-5000 K. Further, in embodiments the color rendering index is at least 70. Hence, the one or more light generating devices and the two or more luminescent materials may especially be selected that the system light (in the first operational mode) has a CRI of at least about 70.

In specific embodiments, the red color rendering index ($R_9$) may be at least 0. More especially, the red color rendering index ($R_9$) may be larger than 0. For instance, in embodiments the correlated color temperature which may be selected from the range of 1800-6500 K, such as in specific embodiments selected from the range of 2000-4000 K, and the red color rendering index ($R_9$) may be at least 0.

In specific embodiments, IES TM-30 Fidelity Index Rf may be selected from the range 55-95 and the IES TM-30 Gamut Index Rg may be selected from the range of 90-115.

In specific embodiments, the system light may have chromaticity coordinates selected from one of the ANSI Extended Nominal CCT categories between 2200 K and 6500 K. The ANSI Extended Nominal CCT categories are described in ANSI C78.377-2017, especially table 2 (page 4). There appear to be 10 Nominal CCT categories, each having its own center CCT, tolerance, and center Duv. Herein, the Duv tolerance may be defined as "center Duv"±cl. According to ANSI C78.377-2017, c1=0.0060. In the present invention, especially c1 may be at maximum 0.0050, such as more especially at maximum 0.0040.

Therefore, in embodiments the system light may have a color point within one of the ANSI Extended Nominal CCT categories.

However, the system light may also have a color point within the basic ANSI CCT (see also table 1 of ANSI C78.377-2017). The same Duv tolerances as described above may also apply.

In specific embodiments, the first luminescent material comprises a luminescent material of the type $A_3B_5O_{12}$:Ce, wherein A comprises one or more of Y, La, Gd, Tb and Lu, and wherein B comprises one or more of Al, Ga, In and Sc. Especially, in embodiments A may comprises one or more of Y, Gd, and Lu and/or B may comprise one or more of Al and Ga. The more Ga, the blue-shifted the emission may be; the more Gd, the more red-shifted the emission may be.

Further, it may be desirable to include an orange-red emitting luminescent material, especially in embodiments a broad band orange-red emitting luminescent material. In embodiments, the orange-red emitting luminescent material may also emit part of its radiant flux in the visible in the orange wavelength range. Such luminescent material is herein also indicated as "second luminescent material". As will be clear from the above, the term "second luminescent material" may in embodiments also refer to two or more different second luminescent materials.

In specific embodiments, a peak wavelength of the second luminescent material selected from the range of 590-680 nm, especially 600-680 nm, more especially 600-650 nm, more especially at least 600 nm, such as even more especially at least about 605 nm. Further, in embodiments, the second luminescent material may have an emission band in the indicated wavelength range having a full width half maximum of at least about 40 nm, more especially at least about 50 nm (see also above about broad band emitters).

Therefore, in specific embodiments the second luminescent material may comprise a first orange-red emitting luminescent material configured to generate luminescent material light having a peak wavelength selected from the range of 600-650 nm and having a full width half maximum selected from the range of 60-100 nm.

Such broad band orange-red emitter may especially be based on divalent europium, such as a divalent europium doped nitride luminescent material (see e.g. also above). Hence, in embodiments the first orange-red emitting luminescent material may comprise a divalent europium doped nitride luminescent material.

Alternatively to or additional to the broad band orange-red emitter, a narrow band emitter may be applied. Especially both may be applied. Especially, the narrow-band emitter may have a peak wavelength selected from the range of 590-680 nm, more especially 600-680 nm, such as in specific embodiments a peak wavelength selected from the range of 610-640 nm. Such narrow band emitter may be selected from narrow band emitting luminescent materials, such as including quantum dots. However, in yet further specific embodiments, a red emitting LED may be applied. These respective options will be discussed below.

Assuming a narrow band emitting luminescent material, desirable the full width half maximum may be at maximum 40 nm. Hence, in embodiments, the second luminescent material may comprise a second orange-red emitting luminescent material configured to generate luminescent material light, especially having a peak wavelength selected from the range of 590-680 nm, more especially 600-680 nm, such as in specific embodiments a peak wavelength selected from the range of 610-640 nm, and especially having one or more emission lines having a full width half maximum selected from the range of up to 50 nm, such as especially up to 40 nm. In further specific embodiments, the second orange-red emitting luminescent material may comprises $M'_xM_{2-2x}AX_6$ doped with tetravalent manganese, wherein M' comprises an alkaline earth cation, wherein M comprises a cation, and x is in the range of 0-1, wherein A comprises a tetravalent cation, wherein X comprises a monovalent anion, at least comprising fluorine. Hence, in embodiments, the luminescent material may comprise a luminescent material of the type $M'_xM_{2-2x}AX_6$ doped with tetravalent manganese, wherein M' comprises an alkaline earth cation, M comprises an alkaline cation, and x is in the range of 0-1, wherein A comprises a tetravalent cation, for instance comprising one or more of silicon and titanium, wherein X comprises a monovalent anion, at least comprising fluorine.

A luminescent material of the type $M'_xM_{2-2x}AX_6$ doped with tetravalent manganese is amongst others described in WO2013121355A1, which is herein incorporated by reference. Passages from WO2013121355A1 are also copied herein.

Herein, $M'_xM_{2-2x}AX_6$ doped with tetravalent manganese, may further also shortly be indicated as "phosphor", i.e. the phrase "phosphor comprising $M'_xM_{2-2x}AX_6$ doped with tetravalent manganese" may in an embodiment also be read as $M'_xM_{2-2x}AX_6$ doped with tetravalent manganese phosphor, or (tetravalent) Mn-doped $M'_xM_{2-2x}AX_6$ phosphor, or shortly "phosphor".

Relevant alkaline cations (M) are sodium (Na), potassium (K) and rubidium (Rb). Optionally, also lithium and/or cesium may be applied. In a preferred embodiment, M comprises at least potassium. In yet another embodiment, M comprises at least rubidium. The phrase "wherein M comprises at least potassium" indicates for instance that of all M cations in a mole $M'_xM_{2-2x}AX_6$, a fraction comprises $K^+$ and an optionally remaining fraction comprises one or more other monovalent (alkaline) cations (see also below). In another preferred embodiment, M comprises at least potassium and rubidium. Optionally, the $M'_xM_{2-2x}AX_6$ luminescent material has the hexagonal phase. In yet another embodiment, the $M'_xM_{2-2x}AX_6$ luminescent material has the cubic phase.

Relevant alkaline earth cations (M') are magnesium (Mg), strontium (Sr), calcium (Ca) and barium (Ba), especially one or more of Sr and Ba.

In an embodiment, a combination of different alkaline cations may be applied. In yet another embodiment, a combination of different alkaline earth cations may be applied. In yet another embodiment, a combination of one or more alkaline cations and one or more alkaline earth cations may be applied. For instance, $KRb_{0.5}Sr_{0.25}AX_6$ might be applied. As indicated above, x may be in the range of 0-1, especially x<1. In an embodiment, x=0.

The term "tetravalent manganese" refers to $Mn^{4+}$. This is a well-known luminescent ion. In the formula as indicated above, part of the tetravalent cation A (such as Si) is being replaced by manganese. Hence, $M'_xM_{2-2x}AX_6$ doped with tetravalent manganese may also be indicated as $M'_x M_{2-2x}A_{1-m} Mn_mX_6$. The mole percentage of manganese, i.e. the percentage it replaces the tetravalent cation A will in general be in the range of 0.1-15%, especially 1-12%, i.e. m is in the range of 0.001-0.15, especially in the range of 0.01-0.12.

A comprises a tetravalent cation, and preferably at least comprises silicon. A may optionally (further) comprise one or more of titanium (Ti), germanium (Ge), stannum (Sn) and zinc (Zn). Preferably, at least 80%, even more preferably at least 90%, such as at least 95% of M consists of silicon. Hence, in a specific embodiment, $M'_xM_{2-2x}AX_6$ may also be described as $M'_xM_{2-2x}A_{1-m-t-g-s-zr}Mn_mTi_tGe_gSn_sZr_{zr}X_6$, wherein m and x are as indicated above, and wherein t,g,s,zr are each individually preferably in the range of 0-0.2, especially 0-0.1, even more especially 0-0.05, wherein t+g+s+zr is smaller than 1, especially equal to or smaller than 0.2, preferably in the range of 0-0.2, especially 0-0.1, even more especially 0-0.05, and wherein A is especially Si. X is preferably fluorine (F).

As indicated above, M relates to monovalent cations, but preferably at least comprises potassium and/or rubidium. Other monovalent cations that may further be comprised by M can be selected from the group consisting of lithium (Li), sodium (Na), cesium (Cs) and ammonium ($NH_4^+$). In an embodiment, preferably at least 80% (i.e. 80% of all moles of the type M), even more preferably at least 90%, such as 95% of M consists of potassium and/or rubidium. Especially, in these embodiments x is thus zero.

Hence, in a specific embodiment, $M'_xM_{2-2x}AX_6$ can also be described as $(K_{1-r-l-n-c-nh}Rb_rLi_lNa_nCs_c(NH_4)_{nh})_2AX_6$, wherein r is in the range of 0-1, wherein l, n, c, nh are each individually preferably in the range of 0-1, preferably 0-0.2, especially 0-0.1, even more especially 0-0.05, and wherein r+l+n+c+nh is in the range of 0-1, especially l+n+c+nh is smaller than 1, especially equal to or smaller than 0.2, preferably in the range of 0-0.2, especially 0-0.1, even more especially 0-0.05. X is preferably fluorine (F).

As indicated above, instead of or in addition to the alkaline cation(s), also one or more alkaline earth cations may be present. Hence, in a specific embodiment, $M'_x M_{2-2x}AX_6$ can also be described as $Mg_{mg}Ca_{ca}Sr_{sr}Ba_{ba}(K_kRb_rLi_lNa_nCs_c(NH_4)_{nh})_2AX_6$, with k, r, l, n, c, nh each individually being in the range of 0-1, wherein mg, ca, sr, ba are each individually in the range of 0-1, and wherein mg+ca+sr+ba+k+r+l+n+c+nh=1. In embodiments, k=1, and the others (mg, ca, sr, ba, r, l, n, c, nh) are zero.

As indicated above, X relates to a monovalent anion, but at least comprises fluorine. Other monovalent anions that may optionally be present may be selected from the group consisting of chlorine (Cl), bromine (Br), and iodine (I). Preferably, at least 80%, even more preferably at least 90%, such as 95% of X consists of fluorine. Hence, in a specific embodiment, $M'_xM_{2-2x}AX_6$ can also be described as $M'_x M_{2-2x}A(F_{1-cl-b-i}Cl_{cl}Br_bI_i)_6$, wherein cl, b, i are each individually preferably in the range of 0-0.2, especially 0-0.1, even more especially 0-0.05, and wherein cl+b+i is smaller than 1, especially equal to or smaller than 0.2, preferably in the range of 0-0.2, especially 0-0.1, even more especially 0-0.05. Especially, X essentially consists of F (fluorine).

Hence, $M'_xM_{2-2x}AX_6$ can also be described as $(K_{1-r-l-n-c-nh}Rb_rLi_lNa_nCs_c(NH_4)_{nh})_2Si_{1-m-t-g-s-zr}Mn_mTi_tGe_gSn_sZr_{zr}(F_{1-cl-b-i}Cl_{cl}Br_bI_i)_6$, with the values for r, l, n, c, nh, m, t, g, s, zr, cl, b, i as indicated above. X is preferably fluorine (F).

Even more especially, $M'_xM_{2-2x}AX_6$ can also be described as $Mg_{mg}Ca_{ca}Sr_{sr}Ba_{ba}(K_kRb_rLi_lNa_nCs_c(NH_4)_{nh})_2Si_{1-m-t-g-s-zr}Mn_mTi_tGe_gSn_sZr_{zr}(F_{1-cl-b-i}Cl_{cl}Br_bI_i)_6$, with k, r, l, n, c, nh each individually being in the range of 0-1, wherein mg, ca, sr, ba are each individually in the range of 0-1, wherein mg+ca+sr+ba+k+r+l+n+c+nh=1, and with the values for m, t, g, s, zr, cl, b, i as indicated above. X is preferably fluorine (F).

In an embodiment, $M'_xM_{2-2x}AX_6$ comprises $K_2SiF_6$ (indicated herein also as KSiF system). As indicated above, in another preferred embodiment, $M'_xM_{2-2x}AX_6$ comprises $KRbSiF_6$ (i.e. r=0.5 and l, n, c, nh, t, g, s, zr, cl, b, i are 0) (herein also indicated as K, Rb system). As indicated above, part of silicon is replaced by manganese (i.e. the formula may also be described as $K_2Si_{1-m}Mn_mF_6$ or $KRbSi_{1-m}Mn_mF_6$, with m as indicated above, or as $KRbSiF_6$:Mn and $K_2SiF_6$:Mn, respectively). As manganese replaces part of a host lattice ion and has a specific function, it is also indicated as "dopant" or "activator". Hence, the hexafluorosilicate is doped or activated with manganese ($Mn^{4+}$).

In specific embodiments, the luminescent material may comprise $(K,Rb)_2SiF_6:Mn^{4+}$. Alternatively or additionally, in embodiments the third luminescent material may comprise $K_2SiF_6:Mn^{4+}$. Alternatively or additionally, in embodiments the third luminescent material may comprise $K_2TiF_6:Mn^{4+}$. In embodiments, the third luminescent material may comprise $K_2(Si,Ti)F_6:Mn^{4+}$. As can be derived from the above, "Si,Ti" may indicate one or more of Si and Ti.

The luminescent material may also be coated, as also described in WO2013121355A1.

Alternatively or additionally, the second luminescent material comprises a third orange-red emitting luminescent material comprising a quantum structure based luminescent material (see also above, such as quantum dots, quantum rods, nanowires, etc.).

Hence, in embodiments the second luminescent material may be configured to convert at least part of the first device light and/or part of the first luminescent material light into second luminescent material light having a peak wavelength selected from the range of 600-680 nm, wherein the second luminescent material at least comprises (i) a luminescent material ("broad-band emitting luminescent material") configured to provide luminescent material light in said wavelength range having a full width half maximum selected from the range of 50-140 nm, and (ii) a luminescent material ("narrow-band emitting luminescent material")configured to generate luminescent material light having a peak wavelength selected from the range of 600-680 nm and having one or more emission lines having a full width half maximum selected from the range of up to 40 nm. Hence, in embodiments the luminescent material light may comprise first luminescent material light, luminescent material light from the broad-band emitting luminescent material, and luminescent material light from the narrow-band emitting luminescent material.

In embodiments, the second luminescent material is configured to convert at least part of the first device light and/or part of the first luminescent material light into second luminescent material light having a peak wavelength selected from the range of 600-680 nm, wherein the second luminescent material at least comprises (i) a (primary second) luminescent material configured to provide luminescent material light in said wavelength range having a full width half maximum selected from the range of 50-140 nm, and (ii) a (secondary second) luminescent material configured to provide luminescent material light in said wavelength range having a full width half maximum selected from the range of up to 40 nm. The former (second) luminescent material may thus be indicated as “broad-band emitting luminescent material” or “first orange-red emitting luminescent material”, and the latter (second) luminescent material may thus be indicated as “narrow-band emitting luminescent material” or “second orange-red emitting luminescent material”. Note that there may also be two or more primary seconds luminescent materials and/or two or more secondary seconds luminescent materials.

Therefore, in other words the luminescent material comprised by the system may comprise a first luminescent material, and at least two different second luminescent materials. Further, (second or third) luminescent materials, are herein not excluded.

Using different ((orang-)red emitting) luminescent materials may allow a relatively simple construction, as in embodiments all luminescent materials may be combined.

As indicated above, it may also be possible to use a direct LED generating device light in the red wavelength range. This may allow a relatively easy way for controlling the spectral power distribution of the system light, and thereby controlling one or more of CRI, $R_9$, and CCT may be possible. Therefore, in embodiments the one or more light generating devices may comprise a second light generating device configured to generate second device light having a peak wavelength in the wavelength range of 590-680 nm, more especially 600-680 nm. In specific embodiments, the second light generating device comprises a solid state light source.

Hence, in embodiments the second light generating device may be configured to generate orange-red (second) device light. In specific embodiments, the second light generating device is configured to generate second device light have a spectral power distribution in the visible, wherein at least 60% of the spectral power, more especially at least 70% of the spectral power, is in the orange-red wavelength range, such as at least about 80%.

Of course, a combination of (i) one or more, especially a plurality of orange-red emitting luminescent materials and (ii) a second light generating device configured to generate second device light having a peak wavelength in the wavelength range of 600-680 nm may be applied. Hence, in embodiments the light generating system may comprise the first orange-red emitting luminescent material and the second light generating device.

A red emitting (direct) LED, or other solid state light source may, enlarge the color gamut and improve CRI and/or $R_9$. Likewise, a green emitting (direct) LED, or other solid state light source, may enlarge the color gamut and improve CRI.

Hence, in embodiments the one or more light generating devices may comprise a third light generating device configured to generate second device light, especially having a peak wavelength in the wavelength range of 490-560 nm. Especially, the third light generating device may comprise a solid state light source.

Hence, in embodiments the third light generating device may be configured to generate green (third) device light. In specific embodiments, the third light generating device is configured to generate third device light have a spectral power distribution in the visible, wherein at least 60% of the spectral power, more especially at least 70% of the spectral power, is in the orange-red wavelength range, such as at least about 80%.

Hence, the one or more light generating devices may at least comprise a first light generating device, especially configured to generate blue first device light, and may optionally comprise one or more of (i) a second light generating device, especially configured to generate second device light having a peak wavelength in the wavelength range of 600-680 nm, and (ii) a third light generating device especially configured to generate second device light having a peak wavelength in the wavelength range of 490-560 nm.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or “projector” or “image projector” may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, a photochemical reactor, and an optical wireless communication device, comprising the light generating system as defined herein. The light generating device may comprise a housing or a carrier, configured to house or support, one or more elements of the light generating system. For instance, in embodiments the light generating device may comprise a housing or a carrier, configured to house or support one or more of a first light generating device, optional further light generating devices, and optional optics.

In yet a further aspect, the invention provides a street lighting device comprising the lighting device as described herein. Such street lighting device may comprise a pole.

In yet a further aspect, the invention also provides the use of the light generating system as described herein or the lighting device as described herein, for street lighting, retail lighting, shop window lighting, general purpose lighting, and façade lighting. Other applications of the light generating system may e.g. be selected from refrigerator display lighting (RDL), architectural lighting, entertainment lighting, home lighting, hospitality lighting, lighting for night shift workers, parking lot lighting, parking garage lighting, etc. The system may be used for Hue products, for dimmable lighting, or for multichannel products.

In yet a further aspect, the invention provides a light generating system configured to generate system light, or a lighting device, configured to generate device light, wherein the system light or the device light, respectively, has a spectral power distribution as depicted in FIG. 4*a* or 4*b*. Variations on the respective spectral power distributions may also be possible, as long as the ratios of the spectral power distributions of each set of two wavelength ranges of 50 nm does not differ more than 5%, such as not more than 2%, of the ratios that can be derived from the depicted spectral power distributions. For instance, would a ratio of the spectral power in the wavelength ranges of 400-450 nm and 450-500 nm be I1/I2, then a variation thereon may have a ratio of I1/I2±5%, or more especially I1/I2±2%.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Particularly in outdoor situations, like on highways, the lighting system should provide a minimum light level at specific times of the day, or in specific weather conditions or traffic situations. To minimize the energy consumption, these lighting systems have a fixed emission spectrum, optimized for energy efficiency. However, the minimum requirements provide light levels that are in the mesopic range of vision, where color vision is impaired because the human cones are not sensitive enough. When the light level is dimmed further in the mesopic range of vision, color recognition and discrimination of colors becomes more difficult or even impossible. An illumination system with an emission spectrum that leads to an increased color saturation, or where the color saturation increases while dimming, will provide a less impaired color appearance compared to illumination systems which are (predominantly) optimized for energy efficiency (and have a fixed emission spectrum). The enhanced color saturation will result in (1) on average a better object (color) visibility at the same light level, and (2) potentially a reduced energy consumption at a lower light level, but with, on average, the same level of object visibility. The emission spectra of most (if not all) current outdoor lighting systems are fixed and are optimized with specification values designed for conventional lighting, such as CRI (CIE 13.3:1995) and Adrian's visibility model (Adrian, 1987).

Another example is a shop window illuminated in the evening or at night to attract potential customers when the shop is closed. The light level shall be low to not consume too much energy, but at the same time the object colors should not appear as dull under the illumination. This situation also calls for energy efficient lighting that maximizes color saturation to support the attractiveness of the object appearance.

The invention describes a light generating system with a light spectrum that may enhance object colors in an energy efficient manner. The invention also describes how a trade-off can be made between a high efficiency mode (at maximum light output) and an enhanced saturation mode (at minimum light output). It describes the illuminating elements for achieving the desired spectral power distributions. Herein, the light intensity of a (first) luminescent material in the green spectral region is not limited to having a full width half maximum of at least 90 nm. Furthermore, the total power of the first luminescent material (or the total power in the spectral range between 480 nm-580 nm) may be substantially less than 65% of the total power in the full visible wavelength range (380 nm-780 nm).

Figure 1:
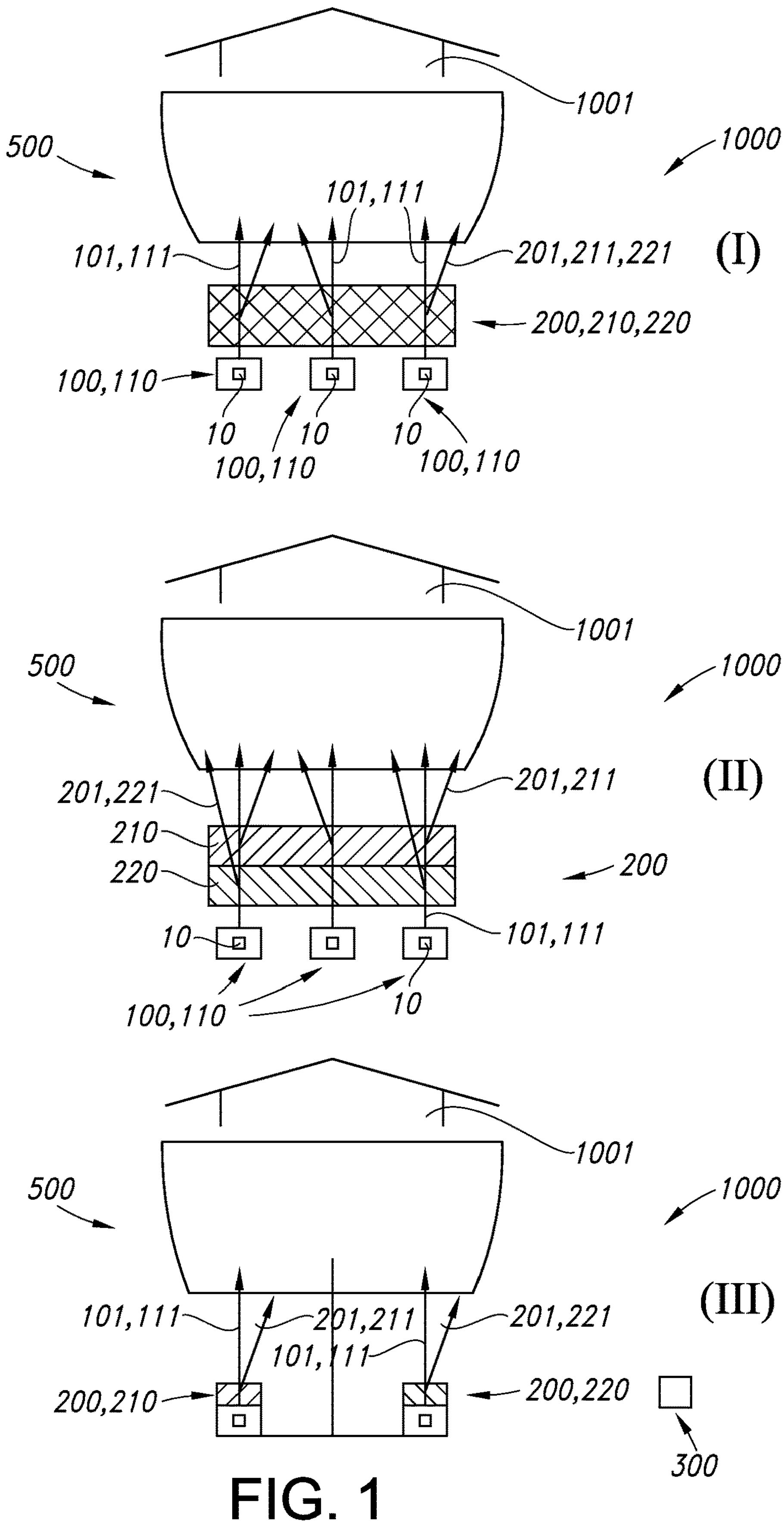
FIG. 1-2 schematically depict some embodiments and variants.

FIG. 1 schematically depicts embodiments of a light generating system 1000 comprising (i) one or more light generating devices 100 and (ii) two or more luminescent materials 200. The one or more light generating devices 100 are configured to generate device light 101. Especially, the one or more light generating devices 100 may comprise solid state light sources, such as LEDs. The one or more light generating devices 100 comprise a first light generating device 110. Especially, the first light generating device 110 may be configured to generate first device light 111 having a peak wavelength selected from the range of 440-460 nm. The two or more luminescent materials are configured to generate luminescent material light 201. The two or more luminescent materials 200 may comprise a first luminescent material 210 and a second luminescent material 220. The first luminescent material 210 may be configured to convert at least part of the first device light 111 into first luminescent material light 211 having a peak wavelength selected from the range of 495-580 nm, and a full width half maximum selected from the range of 25-120 nm. The second luminescent material 220 may be configured to convert at least part of the first device light 111 and/or part of the first luminescent material light 211 into second luminescent material light 221 having a peak wavelength selected from the range of 600-680 nm.

The second luminescent material 220 at least may comprise a luminescent material configured to provide luminescent material light in said wavelength range having a full width half maximum selected from the range of 50-140 nm.

The light generating system 1000 may be configured to generate (in a first operational mode of the light generating system 1000) white system light 1001 comprising at least part of the device light 101 and at least part of the luminescent material light 201.

The white system light has a correlated color temperature (CCT).

The light generating system 1000 may be configured such that the system light 1001 complies with the conditions as described above.

FIG. 1 schematically depicts three embodiments. The luminescent materials 200 are configured downstream of the one or more light generating devices 100. Here, by way of example a plurality of first light generating devices 110 are depicted. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Embodiment I shows an embodiment wherein the first luminescent material 210 and the second luminescent materials 220 are (homogeneously mixed).

Embodiment II shows an embodiment wherein the first luminescent material 210 and the second luminescent materials 220 are provided as separate layers.

Embodiment III shows an embodiment wherein two separate first light generating devices 110 are applied, each with a respective luminescent material layer. Optionally, a control system 300 may individually control the first light generating devices. In this way the spectral power distribution of the system light 1001 may be controlled.

Reference 500 refers to an optical component, such as a lens, a collimator, a homogenizer, etc.

The correlated color temperature, of the system light 1000, may be selected from the range of 1500-6500 K, such as e.g. 2000-4000 K. The color rendering index, of the system light 1000, may be at least 70. In specific embodiments, the correlated color temperature may be selected from the range of at maximum 3000 K.

In specific embodiments, the first luminescent material 210 may comprise a luminescent material of the type $A_3B_5O_{12}$:Ce, A may comprise one or more of Y, La, Gd, Tb and Lu, and B may comprise one or more of Al, Ga, In and Sc.

In specific embodiments, the second luminescent material 220 may comprise a first orange-red emitting luminescent material configured to generate luminescent material light 221 having a peak wavelength selected from the range of 600-650 nm and having a full width half maximum selected from the range of 60-100 nm. Especially, the first orange-red emitting luminescent material may comprise a divalent europium doped nitride luminescent material.

In specific embodiments, the second luminescent material 220 may comprise a second orange-red emitting luminescent material configured to generate luminescent material light 221 having a peak wavelength selected from the range of 600-680 nm and having one or more emission lines having a full width half maximum selected from the range of up to 40 nm. Especially, the second orange-red emitting luminescent material may comprise $M'_xM_{2-2x}AX_6$ doped with tetravalent manganese, wherein M' may comprise an alkaline earth cation, M may comprise a cation, and x may be in the range of 0-1, A may comprise a tetravalent cation, and X may comprise a monovalent anion, at least comprising fluorine. In embodiments, the second luminescent material 220 may comprise a third orange-red emitting luminescent material comprising a quantum structure based luminescent material.

Figure 2:
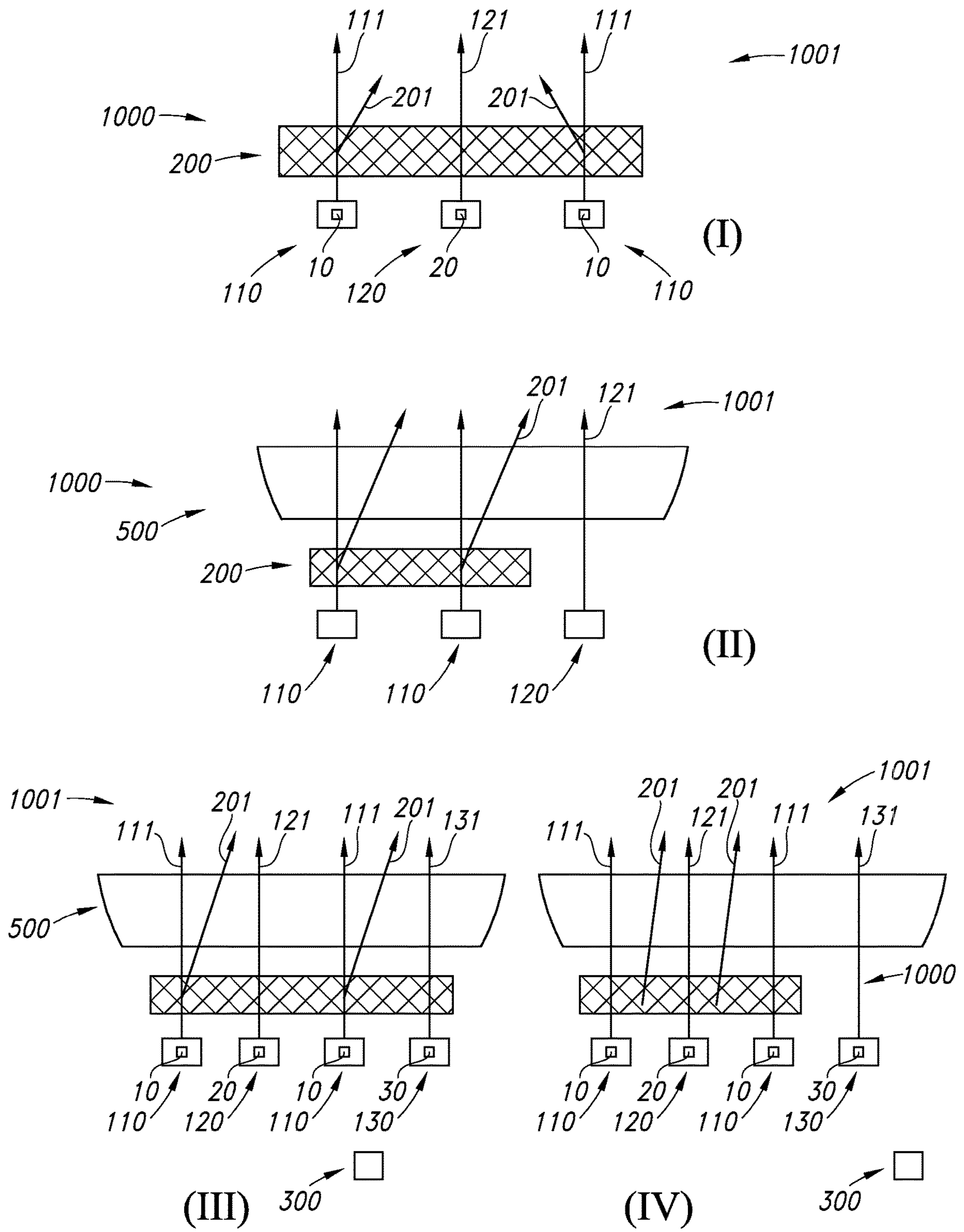

In specific embodiments, the one or more light generating devices 100 comprise a second light generating device 120 configured to generate second device light 121 having a peak wavelength in the wavelength range of 600-680 nm. FIG. 2 schematically depict some embodiments and variants thereof. The second light generating device 120 may comprise a solid state light source.

In embodiment I, the second light generating device 120 is configured upstream of the luminescent material 200. However, especially essentially no conversion of the second device light 121 may take place. In order to prevent any loss of the second device light, the second light generating device 120 may also be configured to bypass with its second device light 121 the luminescent material 200, as schematically depicted in embodiments II of FIG. 2.

Hence, in specific embodiments the light generating system 1000 may comprise the first orange-red emitting luminescent material and the second light generating device 120.

In embodiments, the one or more light generating devices 100 may comprise a third light generating device 130 configured to generate second device light 131 having a peak wavelength in the wavelength range of 490-560 nm. Embodiments III and IV of FIG. 2 show some options. Here, in both embodiments also the second light generating device 120 is depicted. However, in embodiments either the second light generating device 120 or the third light generating device 130 may be present, and in other embodiments, neither of these, or both of these are present. The third light generating device 130 may comprise a solid state light source.

Figure 3:
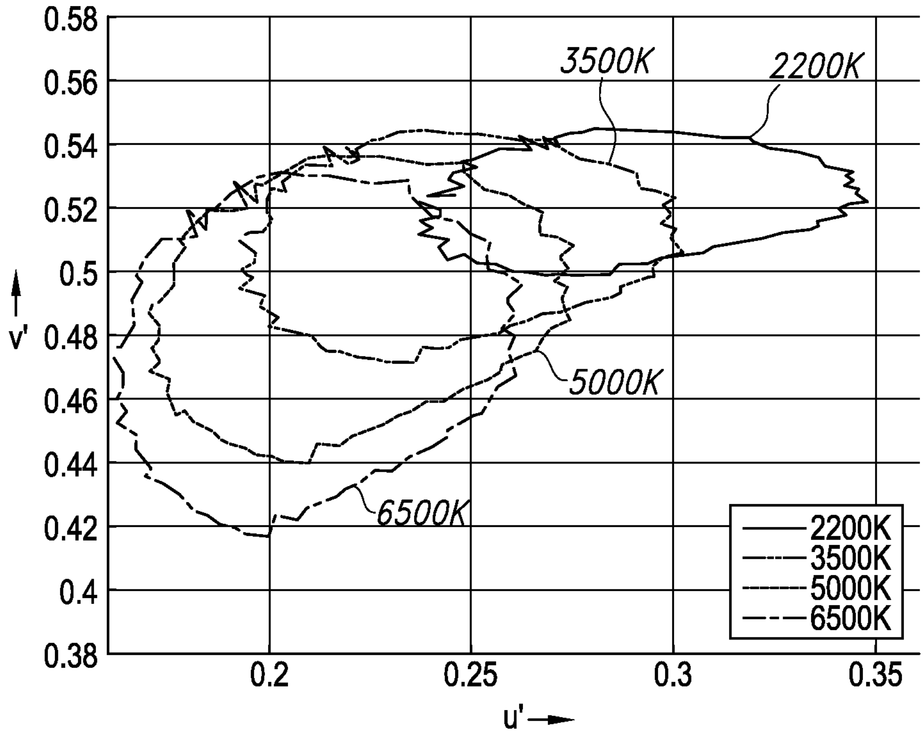
FIGS. 3-4 shown some further aspects.

FIG. 3 shows an example of a color gamut that may be obtained. The gamut is relatively large and a high red saturation may be obtained. FIG. 3 shows the FM100 area for example spectral power distributions (see also FIG. 4), wherein on the x-axis, the CIE 1976 u' color coordinate is indicated, and on the y-axis the CIE 1976 v' color coordinate is indicated for the respective CCTs.

Figure 4A:
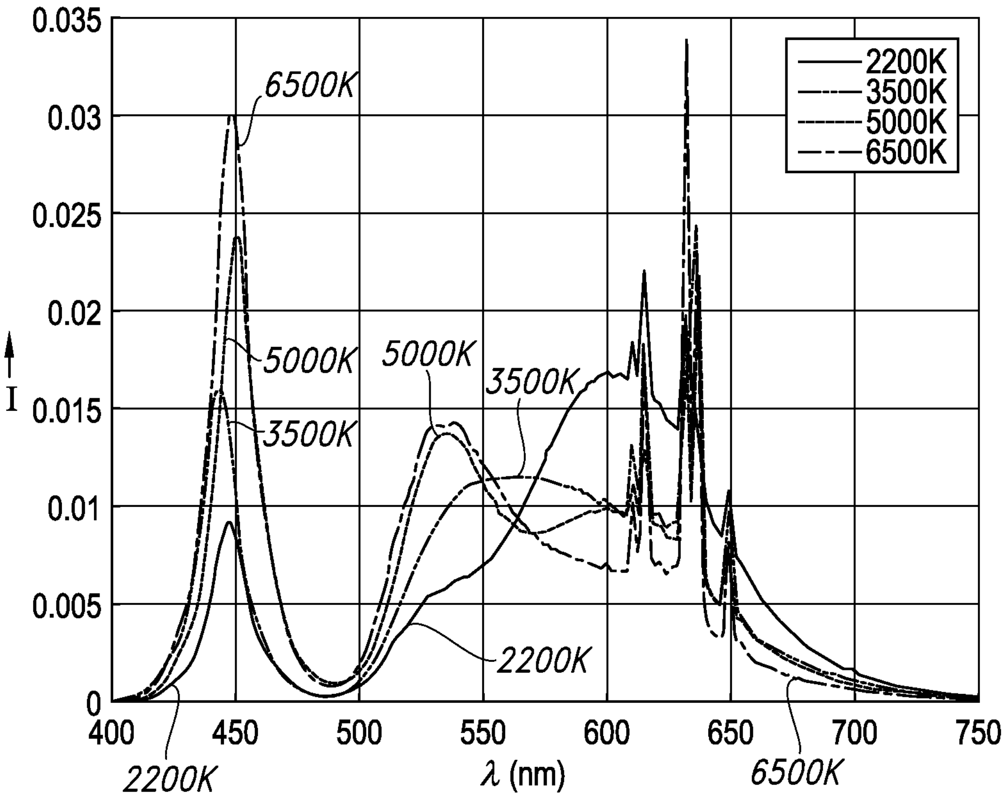

FIG. 4*a* shows some examples of spectral power distributions that were created, having different CCTs. On the x-axis, the wavelength in nm is indicated, and on the y-axis the normalized spectral power.

For the same sample spectra (CCT indicated in italics in below table), also the luminous efficacy of radiation (lm/W) vs FM100 area was determined:

| CCT (K) | Luminous efficacy of radiation (lm/W) | FM100 area |
|---|---|---|
| 2235 | 333 | 0.0035 |
| 2962 | 346 | 0.0043 |
| 3044 | 338 | 0.0051 |
| *3451* | 341 | 0.0055 |
| *5008* | 326 | 0.0070 |
| *6504* | 309 | 0.0080 |

Figure 4B:
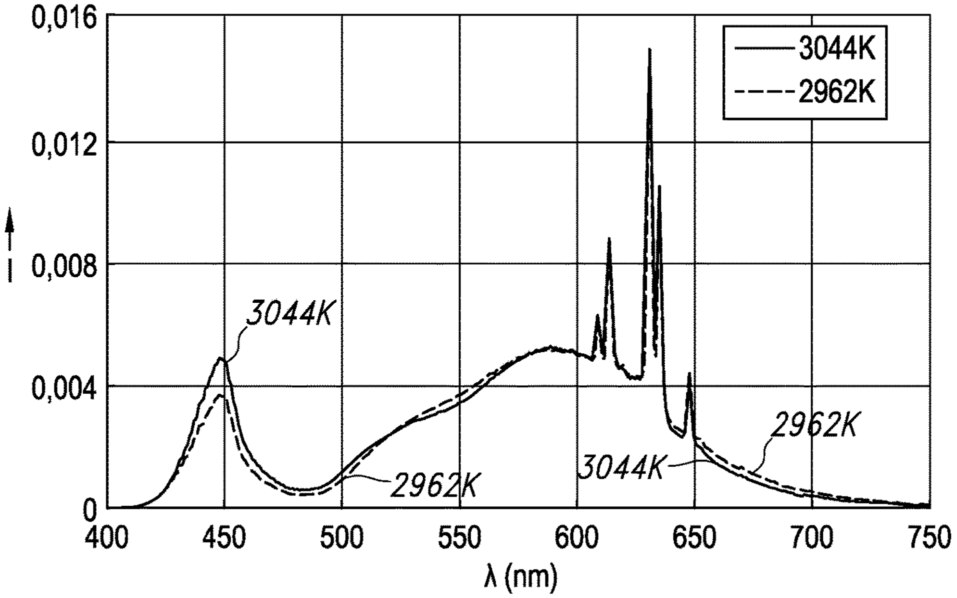

Further spectral power distributions are indicated in FIG. 4*b*, with CCTs of 2962 K and 3044 K, and of which the LER and FM100 area are also indicated above in the table.

Therefore, in embodiments a blue LED was applied and two or more of the following luminescent materials:

$Ca_8MG(SiO_4)_4Cl_2$:Eu("CG512")

$(K_xNa_yLi_{4-x-y})$ $[Li_3SiO_4]_4$:$Eu^{2+}$ wherein x=0-4, y=0-4 and x+y<4 (structure $UCr_4C_4$), see Adv. Optical Materials, 2021, 9, 2101643)("A4-Li3SiO4-4-Eu2")

$(Sr_{1-a-b-c}Ca_bBa_c)Si_xN_yO_z$:$Eu_a{}^{2+}$ wherein a=0.002-0.2, b=0.0-0.25, c=0.0-1.0, x=1.5-2.5, y=0.67-2.5, z=1.5-4 including, for example, $SrSi_2N_2O_2$:$Eu^{2+}$ and $BaSi_2N_{0.67}O_4$:$Eu^{2+}$("SSONe")

(Ba, Sr)$MgAl_{10}O_{17}$:$Mn^{2+}$("VG401b")

β-SiAlON, $Si_{(6-z)}Al_zO_zN_{(8-z)}$:$Eu^{2+}$("BG601g")

Garnet, $(Lu_{1-x-y-a-b}Y_xGd_y)_3(Al_{1-z-u}Ga_zSi_u)_5O_{12-u}N_u$:$Ce_aPr_b$ wherein 0≤x≤1, 0≤y≤1, 0<z≤0.1, 0≤u≤0.2, 0<a≤0.2 and 0≤b≤0.1, such as $Lu_3Al_5O_{12}P$:$Ce^{3+}$ and $Y_3Al_5O_{12}$:$Ce^{3+}$("Y468")

$(Ca_{1-x-y}Sr_y)AlSiN_3$:$Eu_x{}^{2+}$("BR2/607a" or SCASN")

The spectral power distributions were tuned to the herein described conditions, and compared to commercially available white emitting LEDs, used for street lighting purposes. Within the range of 2000-4000 K for all examples, the color gamut (as defined by the FM100 area) is (substantially) larger. A plurality of spectral power distributions, with CCTs in the range of 2200-4000 K were generated complying with the above described conditions. The FM100 area values were all well above 3.0E-03 for 2200 K, well above 3.7E-03 for 2700 K, well above 4.1E-03 for 3000 K and (well) above 5.3E-03 for 4000 K. The FM100 reference values were all below the indicated minimum values for these different CCTs.

Figure 5:
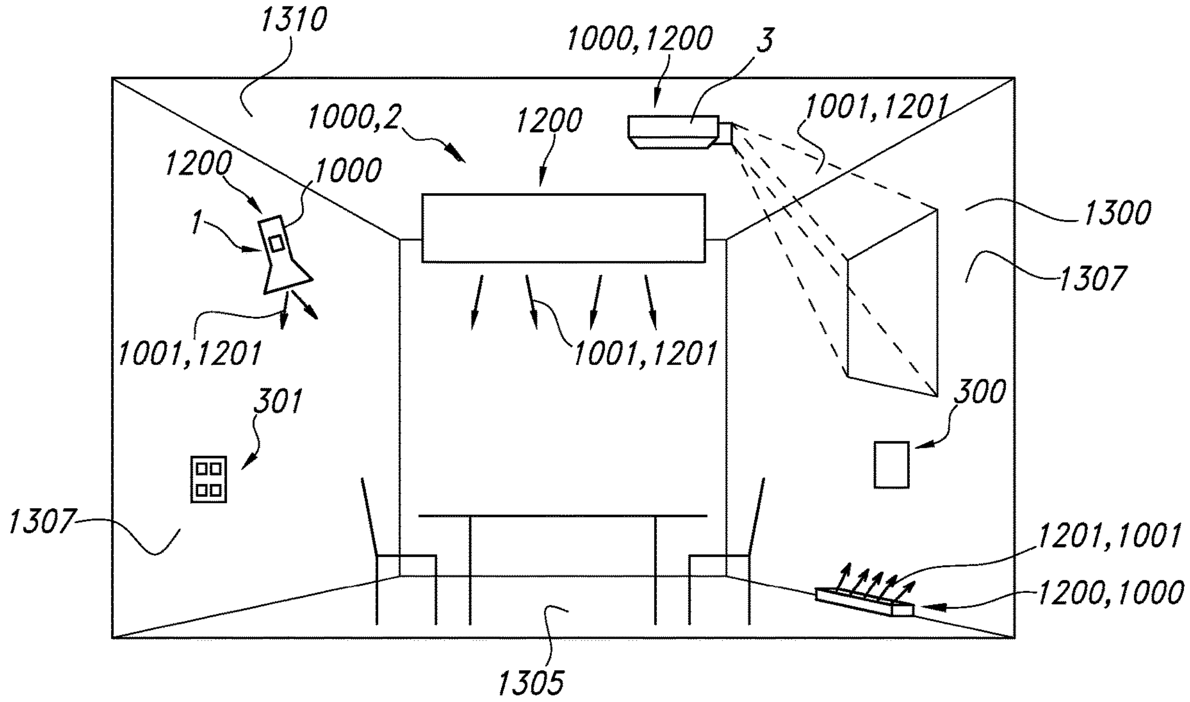
FIGS. 5-6 schematically depict some applications.

FIG. 5 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 3 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001. Reference 1300 refers to a space, such as a room. Reference 1305 refers to a floor and reference 1310 to a ceiling; reference 1307 refers to a wall.

Figure 6:
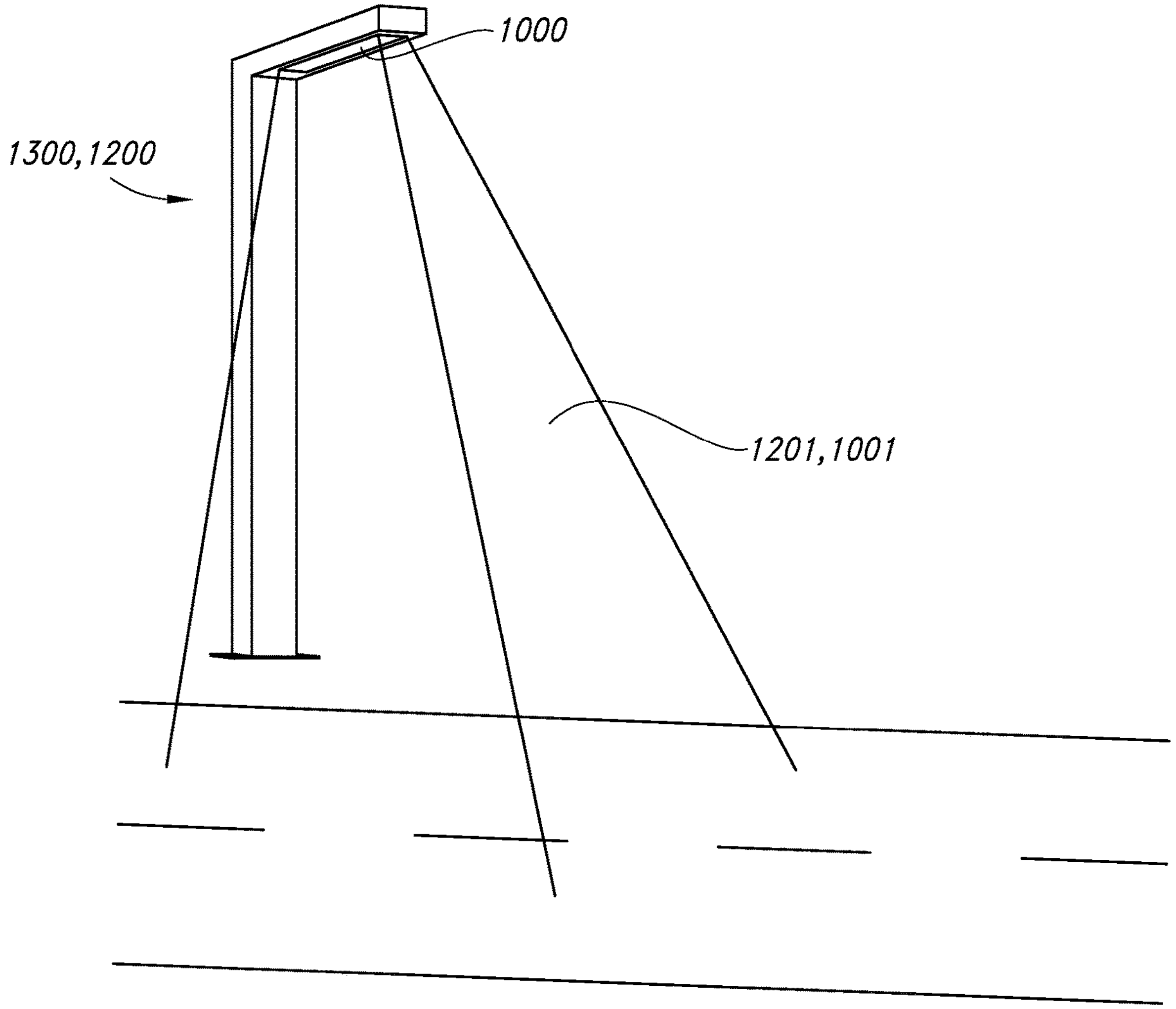

FIG. 6 schematically depict a street lighting device 1300 comprising the lighting device 1200. The street lighting device 1300 may be configured to generate (device) light 1201 which may essentially be system light 1001.

Hence, the light generating system 1000 or the lighting device 1200 may e.g. be used for street lighting, retail lighting, shop window lighting, general purpose lighting, and façade lighting.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising (i) one or more light generating devices and (ii) two or more luminescent materials, wherein:

the one or more light generating devices are configured to generate device light; wherein the one or more light generating devices comprise a first light generating device; wherein the first light generating device comprises a solid state light source;

the first light generating device is configured to generate first device light having a peak wavelength selected from the range of 440-460 nm;

the two or more luminescent materials are configured to generate luminescent material light; wherein the two or more luminescent materials comprises a first luminescent material and a second luminescent material;

the first luminescent material is configured to convert at least part of the first device light into first luminescent material light having a peak wavelength selected from the range of 495-580 nm, and a full width half maximum selected from the range of 25-120 nm;

the second luminescent material is configured to convert at least part of the first device light and/or part of the first luminescent material light into second luminescent material light having a peak wavelength selected from the range of 600-680 nm, wherein the second luminescent material at least comprises (i) a luminescent material configured to provide luminescent material light in said wavelength range having a full width half maximum selected from the range of 50-140 nm, and (ii) a luminescent material configured to generate luminescent material light having a peak wavelength selected from the range of 600-680 nm and having one or more emission lines having a full width half maximum selected from the range of up to 40 nm;

the light generating system is configured to generate white system light comprising at least part of the device light and at least part of the luminescent material light, wherein the white system light has a correlated color temperature; and the light generating system is configured such that the system light complies with the following conditions:

a luminous efficacy of radiation (LER) above the equation $LER_{min}=0.90*(-5.946E-13*x^4+1.247E-08*x^3-9.622E-05*x^2+3.115E-01*x+6.0)$;

an area F1 in the CIE 1976 u'v' chromaticity space enclosed by the 85 test-color samples of the Farnsworth-Munsell 100 (FM100) Hue Test has a value smaller than given by the equation $F1_{max}=(-5.519E-15*x^3-4.380E-11*x^2+1.724E-06*x+1.17E-03)\pm 10\%$ and a larger value than given by the equation $F1_{min}=(F1_{max}-1.67E-03)\pm 10\%$;

a first radiant flux E1 within the wavelength range of 380-490 nm, relative to a total radiant flux Et in the wavelength range of 380-780 nm is below the equation $E1_{max}/Et=(3.207E-11*x^3-1.097E-06*x^2+1.297E-02*x-10.3)\pm 10\%$ and above the equation $E1_{min}/Et=(E1_{max}/Et-6.5)\pm 10\%$;

a second radiant flux E2 within the wavelength range of 491-600 nm, relative to a total radiant flux Et in the wavelength range of 380-780 nm is below the equation $E2_{max}/Et=(3.444E-10*x^3-5.329E-06*x^2+2.611E-02*x+7.7)\pm 10\%$ and above the equation $E2_{min}/Et=(E2_{max}/Et-6.5)\pm 10\%$;

a third radiant flux E3 within the wavelength range of 600-780 nm, relative to a total radiant flux Et in the wavelength range of 380-780 nm is below the equation $E3_{max}/Et=(-2.988E-10*x^3+5.192E-06*x^2-3.294E-02*x+103)\pm 10\%$ and above the equation $E3_{min}/Et=(E3_{max}/Et-6.5)\pm 10\%$; and wherein x is the correlated color temperature, which is selected from the range of 1800-4500 K; and the color rendering index is at least 70; and the red color rendering index ($R_9$) is above the equation $R_{9,min}=(7.84E-11*x^3-2.54E-06*x^2+2.77E-02*x-90)\pm 10\%$.

2. The light generating system according to claim 1, wherein the correlated color temperature of the system light (1001) is selected from the range of 2000-4000 K and the red color rendering index ($R_9$) is larger than 0.

3. The light generating system according to claim 1, wherein the correlated color temperature of the system light is selected from the range of at maximum 3000 K.

4. The light generating system according to claim 1, wherein the system light has chromaticity coordinates selected from one of the ANSI extended CCT categories between 2200 K and 4500 K.

5. The light generating system according to claim 1, wherein the first luminescent material comprises a luminescent material of the type $A_3B_5O_{12}$: Ce, wherein A comprises one or more of Y, La, Gd, Tb and Lu, and wherein B comprises one or more of Al, Ga, In and Sc.

6. The light generating system according to claim 1, wherein the second luminescent material comprises a first orange-red emitting luminescent material configured to generate luminescent material light having a peak wavelength selected from the range of 600-650 nm and having a full width half maximum selected from the range of 60-100 nm; wherein the first orange-red emitting luminescent material comprises a divalent europium doped nitride luminescent material.

7. The light generating system according to claim 6, comprising the first orange-red emitting luminescent material and the second light generating device.

8. The light generating system according to claim 1, wherein the second luminescent material comprises a second orange-red emitting luminescent material comprising $M'_xM_{2-2x}AX_6$ doped with tetravalent manganese, wherein M' comprises an alkaline earth cation, wherein M comprises a cation, and x is in the range of 0-1, wherein A comprises a tetravalent cation, wherein X comprises a monovalent anion, at least comprising fluorine.

9. The light generating system according to claim 1, wherein the second luminescent material comprises a second orange-red emitting luminescent material comprising a quantum structure based luminescent material.

10. The light generating system according to claim 1, wherein the one or more light generating devices comprise a second light generating device configured to generate second device light having a peak wavelength in the wavelength range of 600-680 nm; wherein the second light generating device comprises a solid state light source.

11. The light generating system according to claim 1, wherein the luminous efficacy of radiation (LER) of the system light is above the equation $LER_{min}=0.95*(-5.946E-13*x^4+1.247E-08*x^3-9.622E-05*x^2+3.115E-01*x+6.0)$.

12. The light generating system according to claim 1, wherein the system light complies with:

the area F1 in the CIE 1976 u'v' chromaticity space enclosed by the 85 test-color samples of the Farnsworth-Munsell 100 (FM100) Hue Test has a value smaller than given by the equation $F1_{max}=-5.519E-15*x^3-4.380E-11*x^2+1.724E-06*x+1.17E-03$ and a larger value than given the equation $F1_{min}=F1_{max}-1.67E-03$;

the first radiant flux E1 within the wavelength range of 380-490 nm, relative to a total radiant flux Et in the wavelength range of 380-780 nm is below the equation $E1_{max}/Et=3.207E\text{-}11*x^3-1.097E\text{-}06*x^2+1.297E\text{-}02*x-10.3$ and above the equation $E1_{min}/Et=E1_{max}/Et-6.5$;

the second radiant flux E2 within the wavelength range of 491-600 nm, relative to a total radiant flux Et in the wavelength range of 380-780 nm is below the equation $E2_{max}/Et=3.444E\text{-}10*x^3-5.329E\text{-}06*x^2+2.611E\text{-}02*x+7.7$ and above the equation $E2_{min}/Et=E2_{max}/Et-6.5$;

the third radiant flux E3 within the wavelength range of 600-780 nm, relative to a total radiant flux Et in the wavelength range of 380-780 nm is below the equation $E3_{max}/Et=-2.988E\text{-}10*x^3+5.192E\text{-}06*x^2-3.294E\text{-}02*x+103$ and above the equation $E3_{min}/Et=E3_{max}/Et-6.5$; and the red color rendering index ($R_9$) is above the equation $R_{9,min}=7.84E\text{-}11*x^3-2.54E\text{-}06*x^2+2.77E\text{-}02*x-90$.

13. A lighting device selected from the group of a lamp (1), a luminaire (2), a projector device (3), a disinfection device, a photochemical reactor, and an optical wireless communication device, comprising the light generating system according to claim 1.

14. A street lighting device comprising the lighting device according to claim 13.

15. Use of the light generating system according to claim 1 for street lighting, retail lighting, shop window lighting, general purpose lighting, and façade lighting.

* * * * *